Feb. 17, 1959   J. S. KAMBORIAN   2,873,461
LASTING MACHINE
Filed Sept. 27, 1954   3 Sheets-Sheet 1
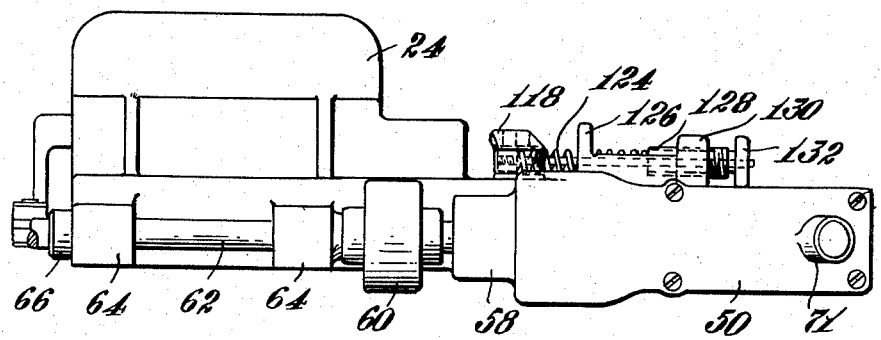
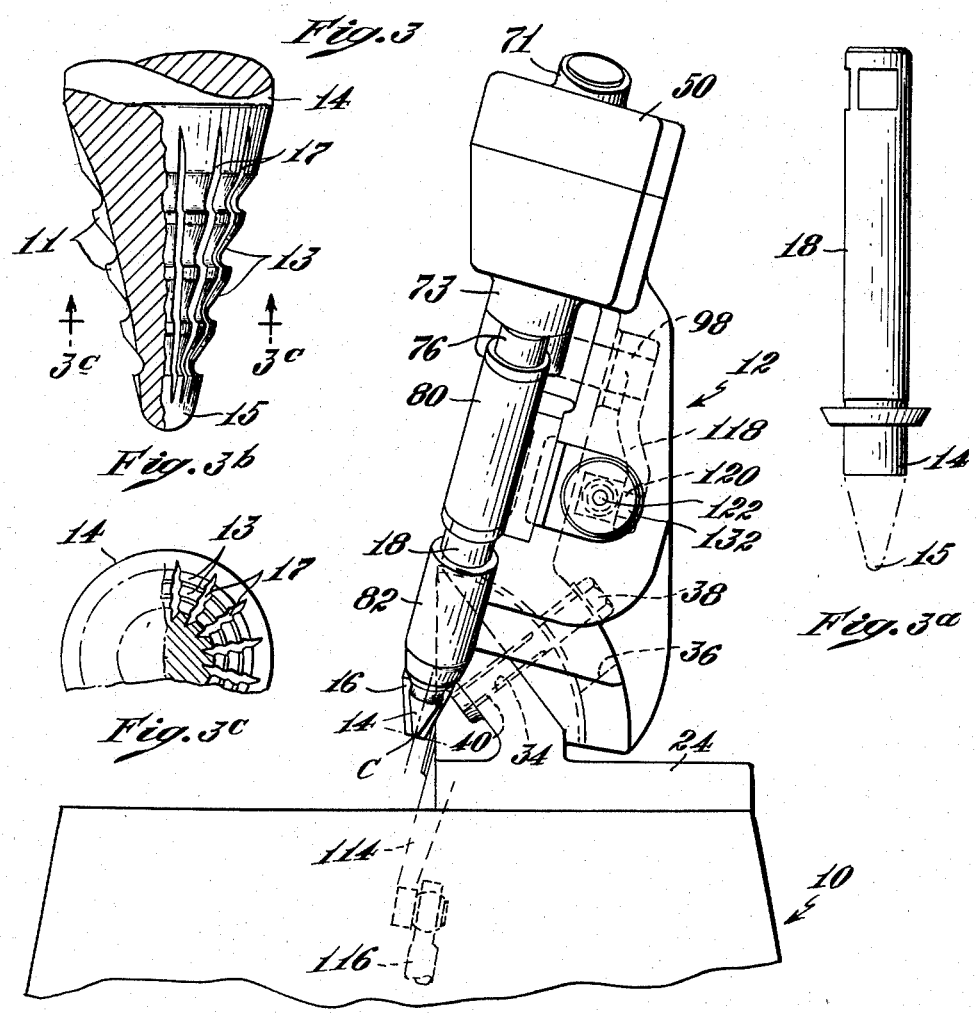
Inventor
Jacob S. Kamborian
by Roberts, Cushman & Grover
Att'ys

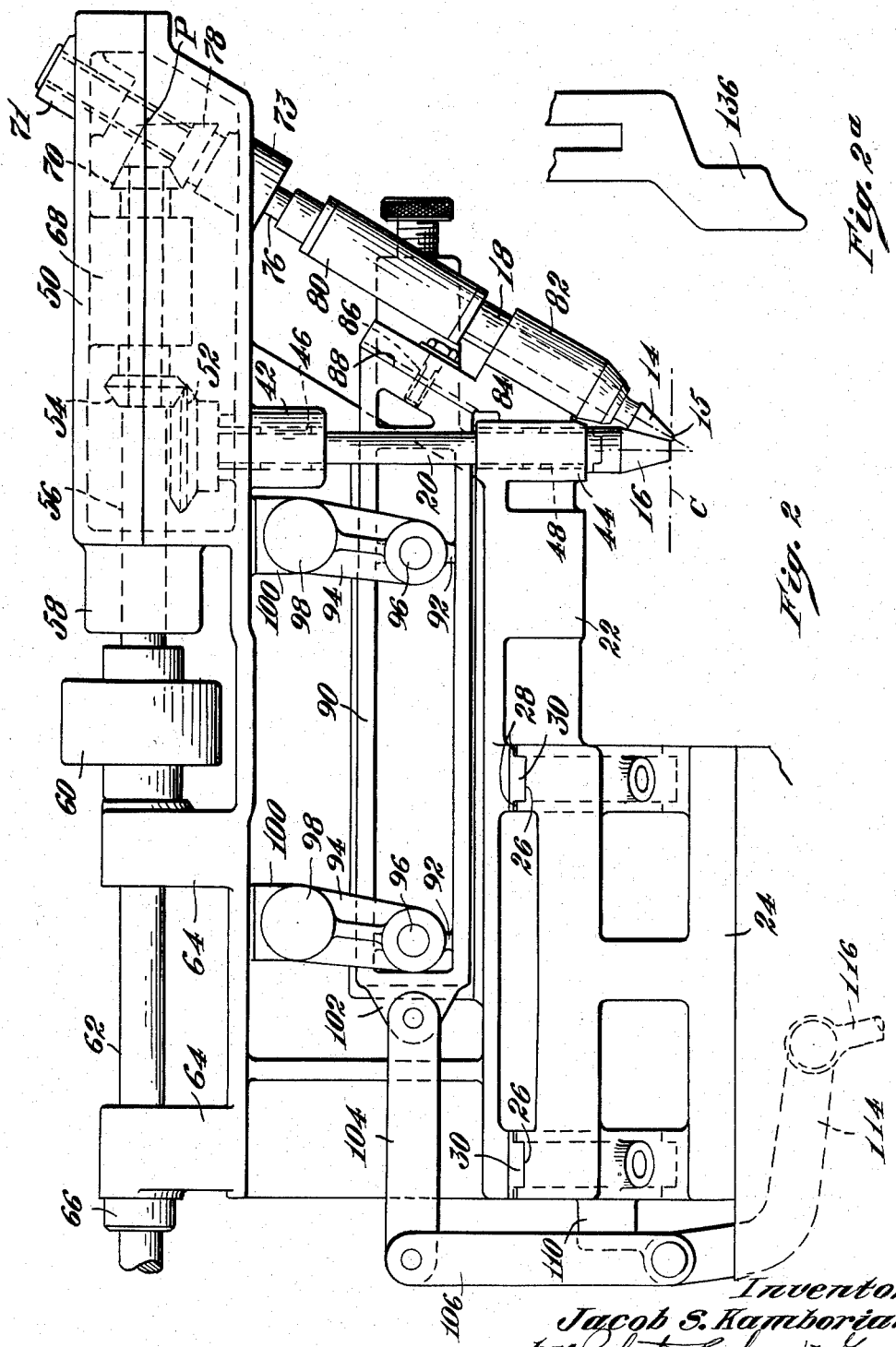

Feb. 17, 1959   J. S. KAMBORIAN   2,873,461
LASTING MACHINE
Filed Sept. 27, 1954   3 Sheets-Sheet 3

Inventor
Jacob S. Kamborian
by Roberts, Cushman & Grover
Attys

United States Patent Office 2,873,461
Patented Feb. 17, 1959

2,873,461

LASTING MACHINE

Jacob S. Kamborian, West Newton, Mass.

Application September 27, 1954, Serial No. 458,462

16 Claims. (Cl. 12—8.3)

This invention relates to lasting machines of the kind in which a pair of elements, at least one of which is a rotatable roll, continuously grip successive areas of the lasting margin of a shoe presented thereto in a manner simultaneously to apply feeding and drafting stresses thereto. It is to be understood, however, that as hereinafter described the machine is equally useful in stretching a flexible covering over a core or form for making panels and similar articles.

The principal objects of the invention are to provide a machine which has continuously operating feeding and drafting members for progressively advancing a shoe being operated upon and applying lasting stresses thereto which will not only embody the advantageous characteristics of my prior machine but will in addition provide for applying the drafting stresses in a manner to minimize frictional resistance between the lasting margin and the parts of the last and shoe bottom relative to which it is drawn, to provide a machine which is useful for stretching the lasting margin of both McKay and welt shoes but particularly one for applying stresses to the lasting margin of a welt shoe without interfering with or adversely deforming the welt attaching rib, to provide a machine in which the lasting stress may be varied between a maximum and a minimum in accordance with the texture and weight of the upper material, to provide a machine which may be used in conjunction with staple mechanism without need for independent wiping means and to provide a machine which may be used for cement lasting with rotary or reciprocating wiper means. Another object of the invention is to provide a machine wherein if cement is used for attaching purposes a quantity of hot cement may quickly be supplied through an appropriate applying nozzle to the lasting margin. Other objects are to provide a machine of comparatively simple and durable construction.

As herein illustrated the machine has a cooperating pair of elements for gripping the lasting margin of a shoe presented thereto, at least one of which is a rotatable roll operable in conjunction with the other element continuously to impart updrafting and feeding stresses to the lasting margin, and one of which has a slender extension protruding beyond the operating surface of the other for engagement with the inner side of the lasting margin to hold the lasting margin and the upper contiguous thereto away from the shoulder of the last. The extension preferably is inclined toward the shoe bottom and forwardly in the direction of feed so as to enter between the lasting margin and the shoulder of the last in the manner of a wedge to hold the lasting margin separated from the shoulder and the side of the last during the application of the updrafting and feeding stresses. Preferably both elements are rolls driven in opposite directions to apply feeding movement to the lasting margin and have downwardly, tapering operating surfaces which apply constantly increasing updrafting stresses to the lasting margin substantially perpendicular to the bottom. The inner roll has a sharper taper than the outer roll providing the aforesaid wedge. The slender tapered end of the inner roll not only enters between the shoulder of the last and the lasting margin but readily enters between the attaching rib and the lasting margin of a welt shoe enabling the rolls to grip the lasting margin exclusively of the rib so that drafting stresses applied to the margin do not disturb the rib. In addition the lower side of the inner roll serves as a hold-down for the shoe resisting the updrafting stresses applied to the lasting margin, bears against and holds the edge of the insole against the shoulder of the last and bears against and holds the rib in an upright position. The axes of the rolls are located in a common plane perpendicular to the bottom of the shoe and at right angles to the direction of feed and may be variably inclined in a plane perpendicular to the bottom of the shoe and parallel to its direction of feed, thereby to adjust the stress applied to the lasting margin.

In accordance with the invention there may be used in conjunction with the aforesaid feeding and drafting rolls tack driving or staple driving mechanism of the kind disclosed in Patent Nos. 2,251,284, 2,424,240 and 2,424,239. When used herein, welt staple mechanism of the kind disclosed in Patent No. 2,424,239 is located close to the feed rolls at the sides from which emerges the stressed margin with the staple driver and anvil located in a plane substantially parallel to the bottom of the shoe so that the driver moves reciprocally toward and away from the shoe and operates so as to wipe the lasting margin as it emerges from the feed rolls inwardly, driving the staple at the inward extremity of its movement. If the staple mechanism is to be used for McKay shoes it is located perpendicular to the bottom of the shoe as contrasted to its horizontal position for welt shoes and a fixed or reciprocating wiper is employed in conjunction therewith to fold the lasting margin as it emerges from the rolls prior to the staple driving operation. When used, tack driving mechanism is correspondingly located perpendicular to the shoe bottom.

When used for staple lasting the axes of the feed rolls are inclined upwardly and away from the point of staple driving at a sufficient angle to permit driving the staples substantially perpendicular to the direction of movement of the work.

Alternatively cement lasting may be desired in which case cement is supplied to the lasting margin by appropriate means whereupon the margin is pressed against the bottom by suitable wiping means or the cement may be preapplied and activated during the lasting operation by heating the wiper.

For cement lasting the inclination of the axis of the feed roll may be varied with respect to the direction of feed according to the amount of stress desired for the kind of upper material. Rotary or reciprocating wipers may be employed.

The invention will now be described in greater detail with reference to the accompanying drawings wherein:

Fig. 1 is a front elevation of the machine showing the head carrying the feed roll, mounted on the machine base with the fastening means omitted;

Fig. 2 is a side elevation of the head of the machine as viewed from the left-hand side of Fig. 1 omitting the base;

Fig. 2a is a plan view of the fixed wiper blade;

Fig. 3 is a top view of the head;

Fig. 3a is a side elevation of the inner feed roll and its shaft;

Fig. 3b is a greatly enlarged side elevation of the conical tip of the inner feed roll showing one form of surface treatment for assisting in stressing the lasting margin heightwise;

Fig. 3c is a fragmentary right section on the line 3c—3c of Fig. 3b;

Fig. 4b is a fragmentary front elevation of the feed rolls shown in Figs. 4 and 4a;

Figure 4:
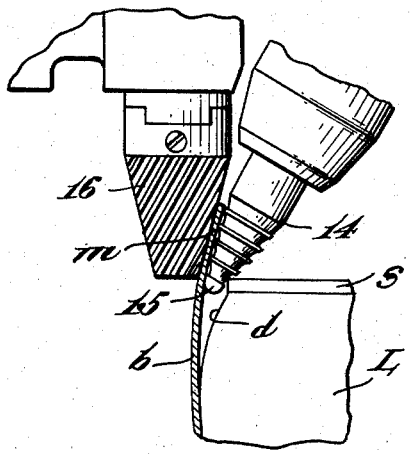
Fig. 4 is a fragmentary side elevation showing the feed rolls engaged with the lasting margin of a McKay shoe as seen from the side thereof from which the lasting margin emerges following stressing.

Referring to Fig. 1 the machine has a hollow base 10 standing upright from the floor on which is mounted a head 12 which carries a pair of rolls 14 and 16 which are rotated in opposite directions as will appear hereinafter for applying feeding and updrafting stresses to the lasting margin of a shoe presented thereto. The rolls have downwardly tapering, conical surfaces and are mounted on shafts 18 and 20, the axes of which converge and lie in a common plane substantially at right angles to a plane which is perpendicular to the bottom of the shoe and parallel to the direction of feed. The conically tapered rolls produce an ever increasing updrafting stress on the lasting margin, thus insuring tautness at all times. The axis of the roll 16 lies in a vertical plane parallel to the direction of movement while the axis of the roll 14 slopes downwardly toward the axis of the roll 16. The axes of the rolls may be angularly tilted as will appear hereinafter through approximately 15° from the vertical. The cone of the roll 14 is sharper and more slender than that of the roll 16 and has a slender tip 15 which extends axially beyond the extremity of the roll 16. Preferably the surfaces of both rolls 14 and 16 are roughened and may optionally have ribbing or grooves of appropriate design to assist in gripping and applying both feeding and drafting stresses to the lasting margin. Preferably the conical surface of the roll 14, as shown in Figs. 3b and 3c, has a plurality of teeth 11 arranged circumferentially thereof in spaced parallel tiers. This is effected by forming axially spaced, circumferential grooves 13 in the conical surface which are deepest near their lower sides and making V-shaped grooves 17 in the conical surfaces parallel to the axis of the cone at uniformly spaced points about the axis. One side of each V-shaped groove coincides with a radius of the cone and the other side lies at an angle thereto.

To effect angular adjustment of the feed rolls in accordance with one aspect of the invention for the purpose of increasing or decreasing the drafting stress applied to the lasting margin the head 12 has a part 22 which is supported for tilting on a fixed part 24 which is bolted to the top of the pedestal 10. As illustrated in Fig. 2 the fixed part 24 has spaced arcuate bearing surfaces 26—26 each of which is provided with spaced flanges 28—28 and the part 22 has on it correspondingly spaced bearing tracks 30—30 slidably engaged with the bearing surfaces 26—26 between the flanges 28—28. The centers of the radii of curvature of the bearings 26—26 lie on a horizontal line in the plane of the axes and passes through the lower ends of the roll 16 as shown by the dot and dash line C so that angular adjustment of the part 22 to change the inclination of the feed rolls takes place about the line C as a center. A hole 34 is drilled in the part 24 through each of the bearing surfaces 26 along a line which coincides with the radius of curvature of the bearings and the lower end is threaded at 40. The part 22 has in its bearing track slots 36—36. Bolts 38—38 are placed through the slots 36—36 into the holes 34—34 and screwed into the lower threaded ends thereof, thereby providing adjustable means for the part 22 with reference to the part 24 at any given desired angular position.

The shaft 20 for the roll 16 (Fig. 2) is supported in spaced bearings 42 and 44 carried by the part 22 which are provided with suitable bearing sleeves 46 and 48. The upper end of the shaft 20 extends into a hollow gear housing 50 of which the bearing 42 is an integral part and which is cast integral with the part 22 and has fast to its upper end a miter gear 52. The gear 52 meshes with a miter gear 54 fast to a horizontally arranged drive shaft 56 journaled in the housing. The shaft 56 extends rearwardly from the housing 50 through a bearing 58 and is connected by a coupling 60 to a horizontal shaft 62 in axial alignment therewith, journaled in upwardly projecting spaced bearings 64—64 formed integral with the part 22. The rear end of the shaft 62 extends through the rear one of the bearings 64 and has fastened thereto a collar 66 which in cooperation with the coupling 60 prevents axial movement of the shaft 62. Rotation of the shaft 62 may be effected in any conventional manner, either by way of a direct drive from an electric motor or indirectly by gears or belting to an electric motor located below the shaft on the top of the pedestal or within it at the base of the machine.

The shaft 56 extends forwardly from the gear 54 through a bearing 68 fastened to the inside of the housing 50 and has fastened to it a second miter gear 70. Forwardly of the miter gear 70 the housing has upper and lower spaced bearings 71 and 73 in which is journaled an inclined shaft 76, the axis of which coincides with the axis of the shaft 18 on which is mounted the roll 14. The shaft 76 has fast to it a miter gear 78 which meshes with the gear 70 and is connected to the shaft 18 by a coupling element 80.

It is desirable to provide for yield between the rolls 14 and 16 during movement of the work therebetween and also to positively separate the feed rolls if the occasion requires it. Accordingly the shaft 18 is provided with a movable bearing 82 near its lower end which is movable to permit limited separation of the rolls. The bearing 82 has a supporting bracket arm 84 which extends upwardly and laterally therefrom. The bracket arm 84 is fastened by a bolt 86 to the forwardly and downwardly inclined face 88 of a slide member 90. The face 88 may be grooved to receive a tongue on the bracket arm 84 so that no skew movement can take place between the two. The slide member 90 is of hollow rectangular construction and has spaced webs 92—92 to which the lower ends of a pair of spaced arms 94—94 are connected by pins 96—96. The upper ends of these arms 94—94 are in turn pivotally connected by pins 98—98 to depending bosses 100—100 integral with the part 22. As thus constructed the slide 90 suspended by the arms 94—94 is movable substantially horizontally. The slide 90 has at its rear end a boss 102 to which is pivotally connected a link 104. The opposite end of the link 104 is pivotally connected to a bell-shaped lever having an upright arm 106 and is pivoted at its elbow on a boss 110 extending rearwardly from the part 22 for tilting movement about a horizontal axis. A downwardly and forwardly inclined arm 114 connects the lever to the upper end of a treadle rod 116. By pulling down on the treadle rod 116 the bell crank lever may be rotated or tilted in a clockwise direction so as to impart a forward thrust to the link 104 and hence to the slide 90 and thus to separate the roll 14 from the roll 16. While the movement of the slide 90 is not strictly linear the arms 94—94 are comparatively long with respect to the actual linear movement required to separate the rolls the desired amount, hence very little vertical displacement of the bearing 82 takes place and such as there is, is taken up by play in the parts. To permit separation of the roll 14 from the roll 16 there of necessity must be angular movement of the shafts 18 and 76; accordingly some clearance is left between the shaft 76 and its bearings 71 and 73 so that the shaft can actually pivot with reference to a center P which corresponds to the intersection of the apices of the conical projections of the gears 70 and 78.

Under operating conditions the roll 14 is yieldably urged toward the roll 16 and it is desirable to provide for varying the pressure between the rolls. Accordingly the upper pivot 98 (Figs. 1 and 3) at the forward end of the slide 90 is provided with an axial extension protruding from one side and has fastened to it an arm 118, the lower end of which carries a pivoted block 120. A rod 122 is threaded at one end to the block 120 and has mounted thereon a strong coiled spring 124, one end of which bears against the block. The rod and spring extend forwardly through an aperture in a flange 126 integral with the part 22 large enough to provide a guiding bearing without binding into a hollow sleeve 128 so that the opposite end of the spring bears against the inner end of the sleeve. A hole in the end of the sleeve permits the end of the rod to extend therethrough. The sleeve is externally threaded and mounted in a correspondingly threaded boss 130 so that by rotation it may be moved axially. A hand wheel 132 is fast to the forward end of the threaded sleeve to assist rotation thereof and by rotation the spring may be compressed or relaxed thereby to increase or decrease the pressure exerted by it on the arm 118. Thus the slide 90 through the arm 118 and its pin 98 is urged rearwardly so as to yieldably hold the roll 14 in gripping relation to the roll 16.

When a shoe mounted on a last together with an insole is presented to the aforesaid machine, the lasting margin may be introduced between the rolls 14 and 16 by a skilled operator without treadling the machine so as to separate them. Separation of the rolls is useful, however, where for example the work becomes jammed or caught so that it may be extricated with the least possible delay and to assist novices in acquiring skill in operation of the machine. When operating on the lasting margin, the shoe (Fig. 4) is presented so as to thrust the ends of the rolls 14 and 16 well down on the lasting margin m with the underside of the roll 14 bearing on the edge of the insole s at the shoulder of the last L and the tip 15 inserted between the shoulder and the inside of the lasting margin. As thus presented the tip acts like a wedge holding the upper material b contiguous to the lasting margin away from the side d of the last. The underside of the roll 14 bears not only against the edge of the insole at the shoulder of the last, holding it firmly against the bottom but also opposes the updrafting stresses of the feed rolls. Thus the updrafting stresses may be applied unopposed by frictional engagement of the upper material with the side and/or corner of the last. This is particularly useful where the lasting margin and/or the edge of the insole is precemented so that there is a tendency for the lasting margin to stick to the shoulder of the last and the insole impairing good lasting.

Figure 5:
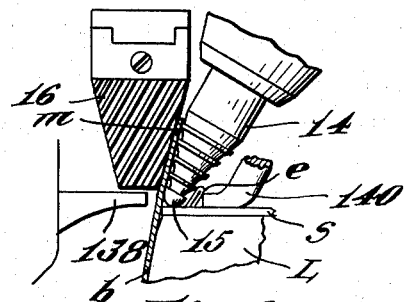
Fig. 5 is a side elevation of the feed rolls as seen from the side from which the lasting margin emerges together with welt stapling mechanism for operating upon a welt shoe.

The machine is particularly useful for applying lasting stresses to welt shoes in which the insole is provided with a welt attaching rib e (Fig. 5). Heretofore continuous type lasting rolls have gripped the rib and lasting margin at the same time and as a result the lasting stress has been inefficiently applied, has operated to bend the attaching rib outwardly so that during the subsequent stapling operation difficulties were experienced in properly driving the staples and has had a tendency to tear the rib. With the use of the present machine the slender tapering end 15 of the roll 14 can easily be inserted between the rib e and the inside of the lasting margin so that the rolls operate only on the lasting margin. Simultaneously the underside of the roll 14 bears against the edge of the insole and the rib e and its effect is to at least hold the rib upright and preferably to push or bend it inwardly thus exposing its base so that when staples are driven through the lasting margin they will enter the rib cleanly and close to its base. In Fig. 5 the tip 15 of the roll 14 is shown resting against the edge of the insole and since no adhesive is used, when staple lasting, very good results can be secured in this fashion. To lessen the frictional drag opposing drafting however the shoe may be held as described above so that the tip actually enters between the shoulder of the last and the inside of the lasting margin thereby holding the lasting margin away from the side of the last.

Figure 6:
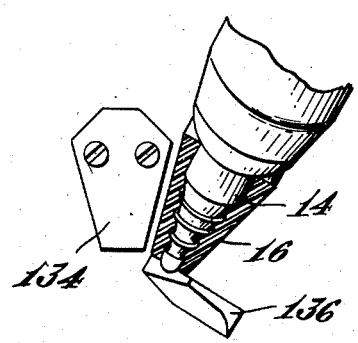
Fig. 6 is a front elevation showing the feed rolls with staple mechanism for operating on McKay shoes.

This machine is designed to have used in conjunction with it staple-attaching means as suggested, tack driving means or cement-attaching means and movable and/or a fixed wiping means where necessary. For McKay staple lasting, staple driving mechanism 134 of the kind shown in Patent No. 2,424,240 is mounted closely adjacent to the feed rolls at the side from which the work emerges as shown in Fig. 6, for driving staples vertically downward into the lasting margin as it is released from the rolls. The part to which the reference character 134 is applied is merely the front cover of the staple driving nozzle and for the details of the mechanism reference may be had to the aforesaid patent. A fixed turning wiper 136, a plan view of which is shown in Fig. 2a, is provided between the rolls and the stapler. When the machine is used for stapling the part 22 is adjusted so as to incline the rolls to the left as shown in Fig. 1. This allows placing the staple mechanism in a vertical position which is best for driving the staples into the work.

For welt staple lasting the staple driving mechanism includes a driver 138 and an anvil 140 (Fig. 5) such as shown in Patent No. 2,424,239 and is arranged in a horizontal plane substantially parallel to the bottom of the shoe and acts not only to drive staples through the lasting margin and into the attaching rib but also as a wiper forcing the stressed lasting margin as it is released from the rolls inwardly against the rib, simultaneously with the driving operation. The anvil backs up the rib so that the shoe is constrained while the lasting margin is being stressed inwardly against the rib and clinches the staple legs as they penetrate the upper and rib. When used in this fashion for welt lasting it is not necessary to employ an independent wiper, although, it is preferable to do so in order to more smoothly turn the lasting margin over the shoulder of the last as it is stressed inwardly by the driver.

Figure 7:
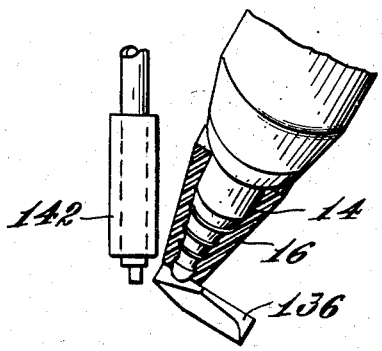
Fig. 7 is a front elevation showing the feed rolls with tack driving mechanism.

Tack driving means may also be employed for example, as shown in Patent No. 2,251,284. Such means 142 is arranged close to the feed rolls as shown in Fig. 7 and a fixed turning tool or wiper 136 such as described above is employed in conjunction therewith.

Figure 4A:
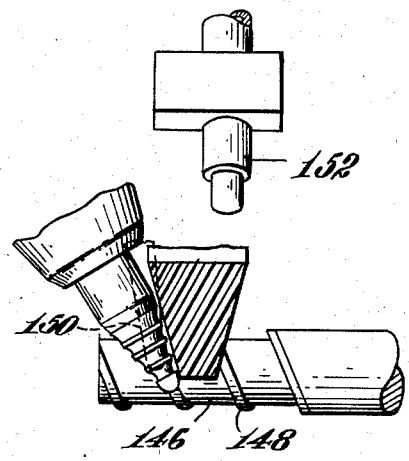
Fig. 4a is a fragmentary side elevation of the feed rolls from the opposite side as seen in Fig. 4 showing in addition a rotary wiper, nozzle for projecting a flame against the wiper and a cement nozzle.
Figure 4B:
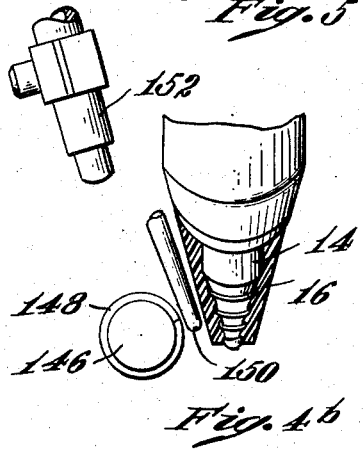

For cement lasting either reciprocating or rotary wipers such as shown in Patent Nos. 2,467,385 and 2,438,917 may be used together with means for supplying cement to the lasting margin or means for activating adhesive which has already been applied. In Figs. 4a and 4b a rotary type wiper 146 having a helical rib 148 for operating on the lasting margin as it is released from the feed rolls is illustrated close to the rolls with a cement nozzle 150 located between the rolls and the wiper. Cement may be supplied to the nozzle 150 in the same fashion as disclosed in Patent No. 2,667,908. If reciprocating wipers were to be used they would replace the rotary roll in location. If desired a blast of hot air or a flame may be played on the wiper 146 by means of a nozzle 152 located closely adjacent thereto as is shown for example in Patent No. 2,571,140. While not shown in Figs. 4a and 4b a fixed wiper or turning blade may be and preferably is used of the kind shown in Figs. 6 and 7.

When using the machine for cement lasting the part 22 which carries the rolls may be tilted to whatever position is desired to effect the desired pull on the lasting margin. However for staple lasting or tack lasting the inclination of the rolls is fixed and determined by the position of the stapling or tacking mechanism which must be located vertically for inserting the fasteners perpendicular to the bottom of the shoe.

It should be understood that the present disclosure is for the purpose of illustration only and that this invention includes all modifications and equivalents which fall within the scope of the appended claims.

I claim:

1. In a lasting machine of the continuous type, a pair of oppositely rotating updrafting rolls having opposed portions which grip the lasting margin therebetween and operate thereon to apply a continuously increasing drafting stress to the margin upwardly with reference to the bottom, said inner roll having a slender tapering surface in rolling contact with the outer roll and being so positioned as to hold the upper material contiguous to the lasting margin away from the shoulder of the last during the application of the updrafting stress.

2. A lasting machine according to claim 1, wherein the inner feed roll has a plurality of radial, circumferentially spaced teeth arranged in axially spaced tiers of progressively diminishing circumference.

3. In a lasting machine of the continuous type, a pair of oppositely rotating updrafting rolls having opposed conical surfaces which grip the lasting margin therebetween and apply a continuously increasing, unremitting lasting stress thereto, the inner side of the inner roll supporting the shoulder of the last as it is held up to the rolls and constituting a shoe positioning gauge in addition to its drafting and feeding functions, and, said inner roll being so positioned with respect to the outer roll as to hold the upper material, contiguous to that portion of the lasting margin gripped between the rolls, away from the shoulder of the last bottom.

4. In a lasting machine of the continuous type for tensioning the lasting margin of an upper mounted on a last substantially perpendicular to the last bottom, a pair of oppositely rotating feeding and updrafting rolls having opposed portions which grip the lasting margin therebetween, the inner roll having a portion adapted to be engaged by the lateral edge of the insole at the shoulder of the last and to constitute an edge gauge limiting the position of the shoe with respect to the nip of the rolls and another portion to project therebeyond inwardly between the shoulder and tensioned upper for holding the lasting margin away from the shoulder.

5. In a lasting machine for fastening the lasting margin of an upper to an insole comprising a pair of drafting and feeding rolls for continuously stressing successive small areas of the lasting margin prior to attaching to the insole, one of said rolls having a portion bearing on the edge of the insole at the shoulder of the last and a portion projecting therebeyond between the inner side of the lasting margin and shoulder of the last, the former portion constituting a hold-down and edge gauge for limiting upward movement of the last in opposition to the drafting stress and lateral movement of the last due to pressure of the operator leaning on the last and the latter portion constituting a spacer holding the upper spaced from the edge of the insole and the contiguous side surface of the last.

6. In a lasting machine for fastening the lasting margin of an upper to an insole, a pair of drafting and feeding rolls for continuously stressing successive small areas of the lasting margin prior to attaching the lasting margin to the insole, said rolls having conical work engaging surfaces, the axis of rotation of the outer roll which has contact with the outer surface of the lasting margin lying in a plane perpendicular to the bottom of the last and parallel to the direction of feed, and the axis of the inner roll which has contact with the inner surface of the lasting margin lying in a plane perpendicular to the bottom of the last and at a right angle to the first-named plane, said inner roll inclining in its plane toward the outer roll, and the extremity of the inner roll extending axially beyond the extremity of the outer roll.

7. In a lasting machine according to claim 6, means supporting the rolls for angular tilting about a horizontal axis lying in a plane passing through the axes of the rolls and passing through the lower end of one of the rolls.

8. In a lasting machine for fastening the lasting margin of an upper to an insole, cooperating inner and outer drafting and feeding rolls inclined downwardly and forwardly in the direction of movement of the work emerging from the rolls for continuously stressing successive small areas of the lasting margin prior to attachment thereof to the insole, said rolls tapering toward their lower extremities, the inner one of the rolls having a sharper taper than the outer roll and having a slender tip extending axially beyond the lowermost extremity of the outer roll.

9. In a lasting machine, a pair of drafting and feeding rolls for contact with the inner and outer sides of the lasting margin of a lasted shoe presented thereto and constituting the sole means for applying uninterrupted drafting stresses to the margin in a continuous and progressive manner about the entire perimeter of the shoe, the axis of the one of said rolls engaging the outer side of the margin lying in a plane which is perpendicular to the bottom of the shoe and parallel to the direction of feed, and the axis of the other of the rolls inclining downwardly toward the axis of the outer roll in a plane at right angles to the plane of the axis of the outer roll, said rolls having downwardly tapering surfaces which have continuous unremitting, gripping contact with the lasting margin along a line inclined toward the axis of the outer roll.

10. In a lasting machine, a pair of drafting and feeding rolls for operating on the lasting margin of a shoe presented thereto, the axes of said rolls lying in and converging in a common plane and at right angles to the direction of feed, said rolls having downwardly tapering, operating surfaces meeting along a line inclined toward the outer side of the shoe, the extremity of the roll engaging the inner side of the lasting margin projecting axially beyond the tip of the outer roll.

11. In a lasting machine, means for applying a drafting stress and feeding movement to the lasting margin of a shoe presented thereto, comprising members adapted to grip the lasting margin therebetween, one of said members being a roll having contact with the outer side of the lasting margin and rotating about an axis to apply an updrafting stress to the lasting margin relative to the other member, and the other member having a slender tip extending axially beyond the operating surface of the roll and outwardly thereof with reference to the shoulder of the last.

12. In a lasting machine, means for applying a drafting stress and feeding movement to the lasting margin of a shoe presented thereto, comprising members adapted to grip the lasting margin therebetween, one of said members having a surface engaged with the outer side of the lasting margin and the other having a downwardly tapering surface engaged with the inner side of the margin, the member engaged with the inner side of the margin having a rotating surface operating to apply an updrafting and feeding stress thereto, and having a portion of its operating surface extending beyond the lower extremity of the surface of the other member for engagement with the lasting margin below the shoulder of the last and outwardly thereof.

13. A lasting machine for operating on a welt shoe in which the shoe bottom has an upstanding welt attaching rib, a pair of drafting and feeding rolls arranged to grip the lasting margin exclusively of the rib to apply updrafting and feeding stress to the lasting margin, the one of said rolls having contact with the inner side of the lasting margin having a tapering end projecting axially beyond the extremity of the other roll which enters the space between the rib and the lasting margin and holds the lasting margin spaced from the rib and from the side of the last during application of the drafting stress.

14. A lasting machine for operating on a welt shoe in which the shoe bottom has an upstanding welt attaching rib, a pair of drafting and feeding rolls arranged to grip the lasting margin exclusively of the rib, the one of said rolls having contact with the inner side of the lasting margin having a tapering end projecting axially beyond the extremity of the other roll, which enters the space between the rib and the lasting margin, the outer part of the inclined surface holding the lasting margin spaced from the side of the last and the inner side of the tapering surface bearing on and bending the rib inwardly.

15. A lasting machine for operating on welt shoes in which the shoe bottom has an upstanding welt attaching rib, members yieldably gripping the lasting margin of the upper therebetween exclusively of the rib, the member having contact with the inner side of the lasting margin being a wedge and having a sharply tapering end and the member at the outer side of the lasting margin being a rotating roll having a surface operable in cooperation with the inner member to apply a drafting stress to the lasting margin which draws the lasting margin upwardly along the outer surface of the wedge, the tip of the wedge being narrow enough to enter the space between the rib and the inner surface of the lasting margin for engagement with the edge of the insole at the shoulder of the last and the inner surface of the wedge bearing against the rib.

16. In a lasting machine a tapered feed and drafting roll having on its tapered surface a plurality of axial spaced, circumferential ribs interspersed by circumferential grooves, the bottoms of the grooves being deepest adjacent the lower side thereof.

References Cited in the file of this patent

UNITED STATES PATENTS

| | | |
|---|---|---|
| 2,326,193 | Baker | Aug. 10, 1943 |
| 2,397,369 | Quinn et al. | Mar. 26, 1946 |
| 2,424,239 | Kamborian | July 22, 1947 |
| 2,424,240 | Kamborian | July 22, 1947 |
| 2,466,817 | MacKenzie | Apr. 12, 1949 |
| 2,467,385 | Kamborian | Apr. 19, 1949 |
| 2,508,360 | Baker | May 23, 1950 |
| 2,516,942 | Baker | Aug. 1, 1950 |
| 2,655,671 | Fossa | Oct. 20, 1953 |
| 2,659,912 | Kamborian | Nov. 24, 1953 |

FOREIGN PATENTS

| | | |
|---|---|---|
| 955,927 | France | July 4, 1949 |